(12) United States Patent
Bhide et al.

(10) Patent No.: US 11,086,754 B2
(45) Date of Patent: Aug. 10, 2021

(54) AUTOMATED FEEDBACK-BASED APPLICATION OPTIMIZATION

(71) Applicant: International Business Machines Corporation, Armonk, NY (US)

(72) Inventors: Manish Anand Bhide, Hyderabad (IN); Vijay Kumar Ananthapur Bache, Bangalore (IN); Srinivas Chebolu, Alpharetta, GA (US); Jhilam Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/460,182

(22) Filed: Jul. 2, 2019

(65) Prior Publication Data

US 2021/0004311 A1    Jan. 7, 2021

(51) Int. Cl.
*G06F 11/36*    (2006.01)
*G06N 20/00*    (2019.01)

(52) U.S. Cl.
CPC ......... *G06F 11/3608* (2013.01); *G06N 20/00* (2019.01)

(58) Field of Classification Search
CPC ............................. G06F 11/3608; G06N 20/00
See application file for complete search history.

(56) References Cited

U.S. PATENT DOCUMENTS

| | | | |
|---|---|---|---|
| 8,938,719 B2 * | 1/2015 | Anjan | G06F 11/3672 717/126 |
| 10,021,169 B2 | 7/2018 | Hendrick et al. | |
| 10,565,537 B1 * | 2/2020 | Askew | G06N 5/003 |
| 10,623,775 B1 * | 4/2020 | Theis | H04N 19/124 |
| 2011/0066486 A1 * | 3/2011 | Bassin | G06Q 10/103 705/14.43 |
| 2011/0307478 A1 * | 12/2011 | Pinckney | G06F 16/9537 707/724 |
| 2012/0166946 A1 * | 6/2012 | Bombolowsky | G06F 9/453 715/708 |

(Continued)

OTHER PUBLICATIONS

Jonassen et al., "Activity Theory as a Framework for Designing Constructivist Learning Environments", 1999, ETR&D, vol. 47, No. 1, pp. 61-79 (Year: 1999).*

(Continued)

*Primary Examiner* — Wei Y Zhen
*Assistant Examiner* — Junchun Wu
(74) *Attorney, Agent, or Firm* — Robert J. Shatto; Madeline F. Schiesser; Keohane & D'Alessandro, PLLC (57) ABSTRACT

Approaches presented herein enable optimization of a developing application to a user base. More specifically, application-centric data is gathered during a cultivation phase of the developing application. Substantially concurrently with the cultivation phase of the developing application, the application-centric data is analyzed according to static code of the developing application, a testing of the developing application, or a user experience (UX) design of the developing application. A machine learning model is applied to the analyzed application-centric data. This machine learning model is trained on historic application feedback data from applications available to the user base. Based on the machine learning model, a recommended change to optimize the developing application to the user base is generated.

20 Claims, 5 Drawing Sheets

(56) References Cited

U.S. PATENT DOCUMENTS

| | | | | |
|---|---|---|---|---|
| 2012/0254092 | A1* | 10/2012 | Malov | G06Q 30/0201 |
| | | | | 706/52 |
| 2013/0246995 | A1* | 9/2013 | Ferrao | G06F 8/35 |
| | | | | 717/104 |
| 2014/0244762 | A1 | 8/2014 | Wyndowe et al. | |
| 2016/0140027 | A1* | 5/2016 | Ug | G06F 11/3636 |
| | | | | 717/129 |
| 2016/0171385 | A1* | 6/2016 | Gross | H04L 67/306 |
| | | | | 706/12 |
| 2016/0173700 | A1* | 6/2016 | O'Connor | H04M 15/60 |
| | | | | 455/405 |
| 2016/0299759 | A1* | 10/2016 | Krajec | G06F 11/3692 |
| 2017/0006135 | A1* | 1/2017 | Siebel | H04L 69/40 |
| 2017/0075786 | A1* | 3/2017 | Ekambaram | G06F 11/3668 |
| 2017/0371688 | A1* | 12/2017 | Kim | G06F 9/44536 |
| 2018/0240017 | A1* | 8/2018 | Huszar | G06F 16/54 |
| 2019/0171552 | A1* | 6/2019 | Mitchell | G06F 11/3672 |
| 2019/0361579 | A1* | 11/2019 | Srivastava | A61B 5/746 |
| 2020/0103876 | A1* | 4/2020 | Dipert | G06N 20/00 |
| 2020/0117583 | A1* | 4/2020 | Durairaj | G06F 11/3692 |
| 2020/0342358 | A1* | 10/2020 | Flanagan | G06N 20/00 |

OTHER PUBLICATIONS

Spinner et al., "Proactive Memory Scaling of Virtualized Applications", 2015, IEEE (Year: 2015).*

Tong et al., "Support Vector Machine Active Learning for Image Retrieval", 2001, ACM (Year: 2001).*

Portugal et al., "The use of machine learning algorithms in recommender systems: A systematic review", 2017, Elsevier Ltd. (Year: 2017).*

"An Automated Feedback-Based Approach to Support Mobile App Development", 2017 43rd Euromicro Conference on Software Engineering and Advanced Applications (SEAA), Sep. 28, 2017, Abstract, 1 pg.

Dhinakaran et al., "App Review Analysis via Active Learning", 2018 IEEE 26th International Requirements Engineering Conference (RE), Oct. 15, 2018, 12 pgs.

Gomez et al., "App Store 2.0: From Crowd Information to Actionable Feedback in Mobile Ecosystems", IEEE Software, 2017, 7 pgs.

Scherr et al., "An Automated Feedback-based Approach to Support Mobile App Development", 2017 43rd Euromicro Conference on Software Engineering and Advanced Applications, IEEE 2017, 8 pgs.

* cited by examiner

AUTOMATED FEEDBACK-BASED APPLICATION OPTIMIZATION

TECHNICAL FIELD

The present invention relates generally to application development and, more specifically, to providing machine-learning enabled feedback based on application-centric data during the application development process.

BACKGROUND

Digital distribution platforms, such as App Store (a registered trademark of Apple Inc.) or Google Play (a registered trademark of Google LLC.), are common places for users to download and upload mobile or desktop applications. Such digital distribution platforms sometimes offer a review system to gather feedback from previous and current users of a particular application. Reviews from previous/current users can be helpful in assisting perspective users to understand a purpose and use of an application, as well as to make a decision whether to download the application or not. Other factors that can influence a perspective user's decision to download an application can include application pricing (e.g., subscription or one-time payment basis), the presence of in-application purchases, download statistics, requisite application permissions, frequency of updates, data and storage utilization, a description of the application itself, etc. Prospective users generally prefer to have a strong understanding of an application utilization experience before making the decision to download. Moreover, an aggregation of the feedback about an application on the market left on the review system over time in the form of reviews from previous/current users can permit the review system to estimate a quality and/or utilization of the application. In addition to offering information to facilitate a download decision, the review system can offer an application owner, developer, and/or enterprise feedback that can be considered when making improvements and updates to the application. As such, current digital distribution platforms offer a crowd sourced review system based on which perspective users may make a decision to download an application and application owners may make improvements to existing applications.

SUMMARY

Approaches presented herein enable optimization of a developing application to a user base. More specifically, application-centric data is gathered during a cultivation phase of the developing application. Substantially concurrently with the cultivation phase of the developing application, the application-centric data is analyzed according to static code of the developing application, a testing of the developing application, or a user experience (UX) design of the developing application. A machine learning model is applied to the analyzed application-centric data. This machine learning model is trained on historic application feedback data from applications available to the user base. Based on the machine learning model, a recommended change to optimize the developing application to the user base is generated.

One aspect of the present invention includes a method for optimizing a developing application to a user base, the method comprising: gathering application-centric data during a cultivation phase of the developing application; analyzing, substantially concurrently with the cultivation phase of the developing application, the application-centric data according to static code of the developing application, a testing of the developing application, or a user experience (UX) design of the developing application; applying a machine learning model to the analyzed application-centric data, the machine learning model being trained on historic application feedback data from applications available to the user base; and generating, based on the machine learning model, a recommended change to optimize the developing application to the user base.

Another aspect of the present invention includes a computer system for optimizing a developing application to a user base, the computer system comprising: a memory medium comprising program instructions; a bus coupled to the memory medium; and a processor, for executing the program instructions, coupled to an application optimization engine via the bus that when executing the program instructions causes the system to: gather application-centric data during a cultivation phase of the developing application; analyze, substantially concurrently with the cultivation phase of the developing application, the application-centric data according to static code of the developing application, a testing of the developing application, or a user experience (UX) design of the developing application; apply a machine learning model to the analyzed application-centric data, the machine learning model being trained on historic application feedback data from applications available to the user base; and generate, based on the machine learning model, a recommended change to optimize the developing application to the user base.

Yet another aspect of the present invention includes a computer program product for optimizing a developing application to a user base, the computer program product comprising a computer readable hardware storage device, and program instructions stored on the computer readable hardware storage device, to: gather application-centric data during a cultivation phase of the developing application; analyze, substantially concurrently with the cultivation phase of the developing application, the application-centric data according to static code of the developing application, a testing of the developing application, or a user experience (UX) design of the developing application; apply a machine learning model to the analyzed application-centric data, the machine learning model being trained on historic application feedback data from applications available to the user base; and generate, based on the machine learning model, a recommended change to optimize the developing application to the user base.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for optimization of a developing application to a user base. More specifically, application-centric data is gathered during a cultivation phase of the developing application. Substantially concurrently with the cultivation phase of the developing application, the application-centric data is analyzed according to static code of the developing application, a testing of the developing application, or a user experience (UX) design of the developing application. A machine learning model is applied to the analyzed application-centric data. This machine learning model is trained on historic application feedback data from applications available to the user base. Based on the machine learning model, a recommended change to optimize the developing application to the user base is generated.

The illustrative embodiments provide mechanisms that apply machine learning to the problem of identifying shortcomings in developing applications during the cultivation phase and optimizing these applications prior to release by providing change recommendations to correct for these identified shortcomings. The illustrative embodiments use machine learning techniques to train a computer system to recognize features of a developing application in application-centric data associated with the application by using historic user feedback from a user base as training data. This produces a machine learning model that predicts a likely reception of recognized features of the developing application by a user base and can provide recommendations to optimize these features and the developing application to the user base.

Machine learning (ML) is the subfield of computer science that gives computers the ability to learn without being explicitly programmed. Evolved from the study of pattern recognition and computational learning theory in artificial intelligence, machine learning explores the study and construction of algorithms that can learn from and make predictions on data. Such algorithms overcome following strictly static program instructions by making data driven predictions or decisions, through building a model from sample inputs. Machine learning is employed in a range of computing tasks where designing and programming explicit algorithms is unfeasible. Machine learning is closely related to, and often overlaps with, computational statistics, which also focuses on prediction-making through the use of computers.

Machine learning tasks are typically classified into three broad categories, depending on the nature of the learning "signal" or "feedback" available to a learning system. These are as follows:

Supervised learning: The computer is presented with example inputs and their desired outputs, given by a "teacher" or "trainer," and the goal is to learn a general rule that maps inputs to outputs.

Unsupervised learning: No labels are given to the learning algorithm, leaving the algorithm on its own to find structure in its input. Unsupervised learning can be a goal in itself (e.g., discovering hidden patterns in data) or a means towards an end (e.g., feature learning).

Reinforcement learning: A computer program interacts with a dynamic environment in which the computer program must perform a certain goal (e.g., driving a vehicle), without a teacher explicitly telling the computer program whether it has come close to the goal. Another example is learning to play a game by playing against an opponent.

Between supervised and unsupervised learning is semi-supervised learning, where the teacher gives an incomplete training signal: a training set with some, often many, of the target outputs missing. Transduction is a special case of this principle where the entire set of problem instances is known at learning time, except that parts of the targets are missing.

Another categorization of machine learning tasks arises when one considers the desired output of a machine-learned system. Examples are as follows:

In classification, inputs are divided into two or more classes, and the learner must produce a model that assigns unseen inputs to one or more (multi-label classification) of these classes. This is typically tackled in a supervised way.

Spam filtering is an example of classification, where the inputs are email (or other) messages and the classes are "spam" and "not spam."

In regression, also a supervised problem, the outputs are continuous rather than discrete.

In clustering, a set of inputs is to be divided into groups. Unlike in classification, the groups are not known beforehand, making this typically an unsupervised task.

Density estimation finds the distribution of inputs in some space.

Dimensionality reduction simplifies inputs by mapping them into a lower-dimensional space. Topic modeling is a related problem, where a program is given a list of human language documents and is tasked to find out which documents cover similar topics.

Figure 1:
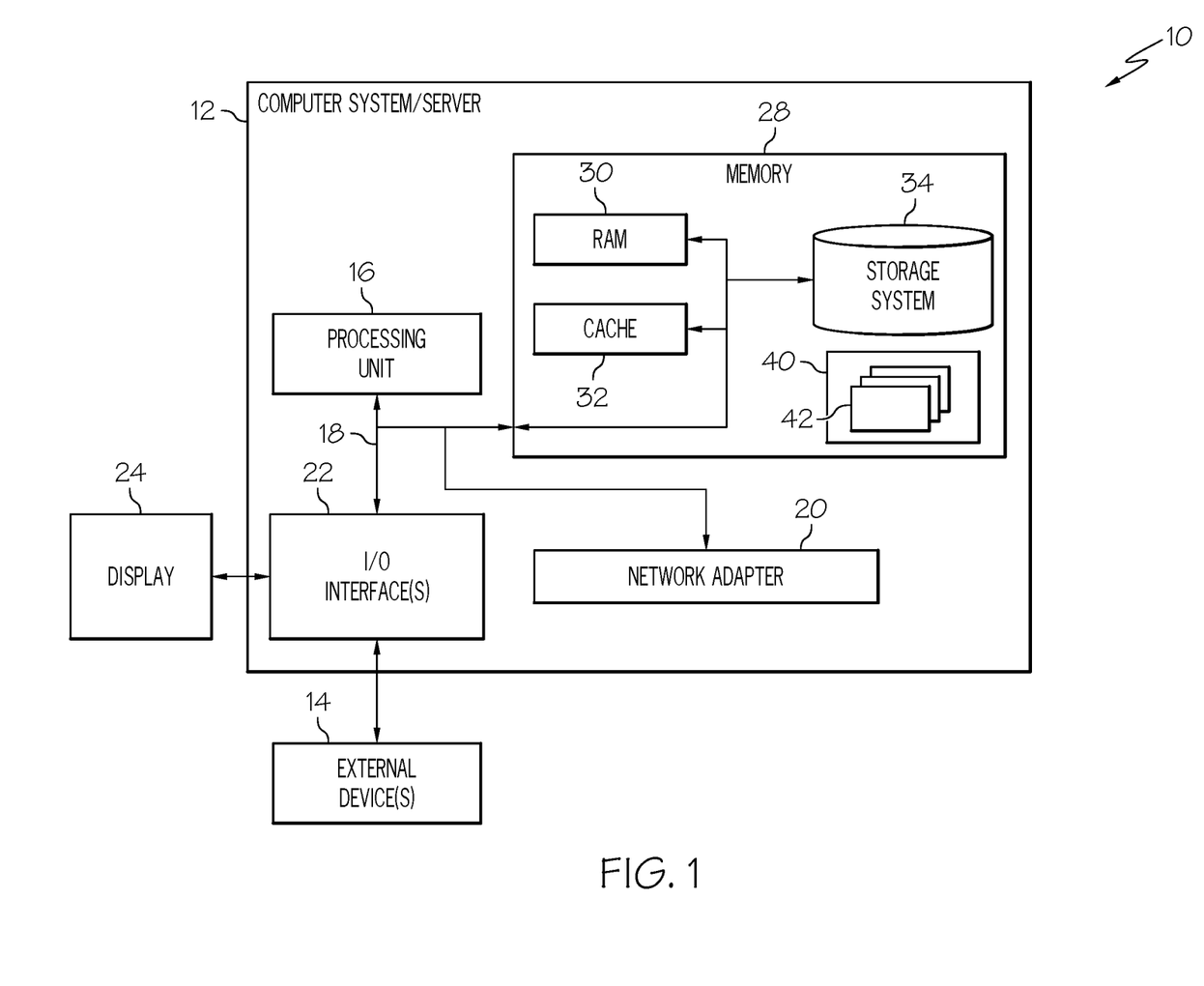
FIG. 1 shows an architecture in which the invention may be implemented according to illustrative embodiments.

Referring now to FIG. 1, a computerized implementation 10 of an embodiment for optimizing a developing application to a user base will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for optimizing a developing application to a user base. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing a developing application to a user base, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Turing now to more specific features of embodiments of the present invention, although digital distribution platforms can include a review component in which previous and current users may leave reviews of applications the users downloaded and used, such platforms are limited to obtaining feedback after a version of an application has been released to such users. However, such user experience is often an important form factor when refining an application, as users' attitudes about using a particular product, system, or service can differ with respect to user behavior. Although some digital distribution platforms provide developers with guidelines, based on patterns which are considered as best practices for user experience, which a developer has to follow in order to upload an application for distribution through the platform, these are not tailored to the developer's particular application. As such, even when a developer follows generic guidelines, subsequent user experience can be unexpected, because user experience is subject to, among other things, practicality, actual experience, meaningfulness, etc. Accordingly, it is desirable to anticipate user responses to an application while it is being developed and prior to initial release. However, the inventors of the present invention have found that there is no automated feedback mechanism available in digital distribution platforms which helps a developer or enterprise to preemptively identify application flaws and drawbacks which might negatively impact user experience.

Accordingly, the inventors of the present invention have developed a solution that provides automated feedback in a digital distribution platform to help an application developer preemptively identify elements of an application that might negatively impact user experience. To accomplish this, embodiments of the present invention analyze application-centric data, including the static code, developmental data, and design data, of a developing application with a machine learning model trained with feedback data from previously existing applications. The machine learning model of the present invention is capable of providing suggestions and/or recommendations to an application's owner/developer for the purpose of optimizing the application for user experience, prior to final development and release of the application.

Embodiments of the present invention offer several advantages for optimizing an application during development for user experience. One such advantage is tailoring a digital distribution platform's guidelines to a particular application, thereby permitting an optimal application to be developed within the platform's guideline. Another advantage is that the application is optimized for user experience when it is initially released, instead of after several rounds of actual user feedback. This decreases the need to further refine the application and release application updates. In turn, fewer application updates can result in an application with a smaller storage footprint. Moreover, an application that is optimized for user experience initially is more likely to retain users and gain additional users at a faster rate, resulting in a higher share of users. Still another advantage of the present invention is streamlining the application development process. Embodiments of the present invention can identify early elements of a developing application that are likely to be unsuccessful and provide quick guidance to remedy such elements, thereby decreasing resource wastage on unsuccessful elements.

Figure 2:
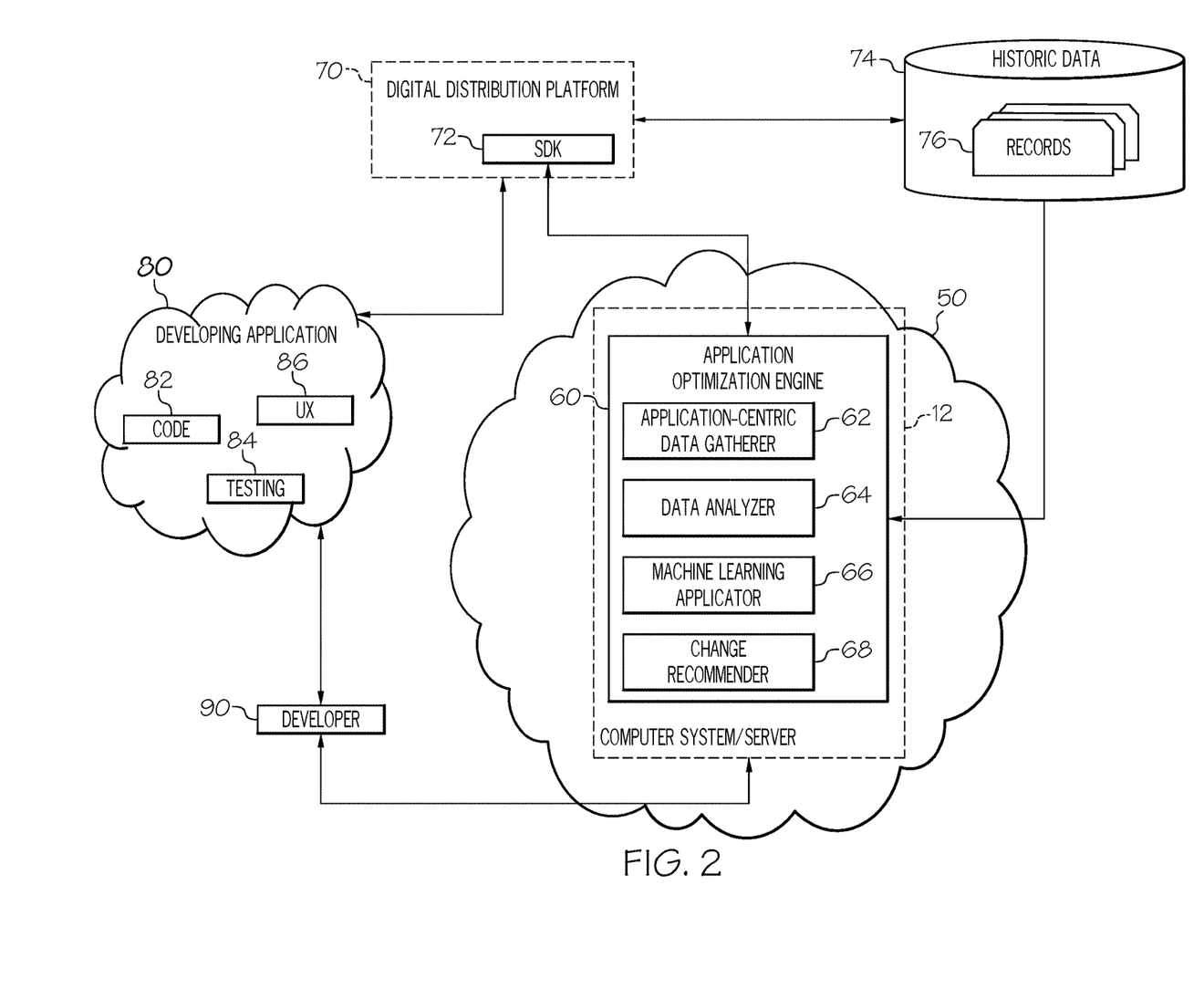
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have an application optimization engine 60 (hereinafter "system 60"). Rather, all or part of system 60 could be loaded on a server or server-capable device that communicates (e.g., wirelessly) with the clients to provide for optimizing a developing application to a user base. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions similar to a general-purpose computer. Specifically, among other functions, system 60 can optimize a developing application to a user base in a networked computing environment. To accomplish this, system 60 can include a set of components (e.g., program modules 42 of FIG. 1) for carrying out embodiments of the present invention. These components can include, but are not limited to, application-centric data gatherer 62, data analyzer 64, machine learning applicator 66, and change recommender 68.

Through computer system/server 12, system 60 can be in communication with a digital distribution platform 70 having a software development kit (SDK) 72. System 60 can obtain records 76 (e.g., user reviews) from a historic data storage 74, either directly through a communication channel between system 60 and storage 74 or indirectly though digital distribution platform 70. Through SDK 72 of digital distribution platform 70, system 60 can receive information about a developing application 80. This developing application information can include static code data 82, application testing data 84, and user experience (UX) data 86. Developing application 80 can be associated with a developer 90, owner, enterprise, etc. In some embodiments, system 60 may be used directly by developer 90 to optimize application 80 during development, without going through digital distribution platform 70.

Figure 3:
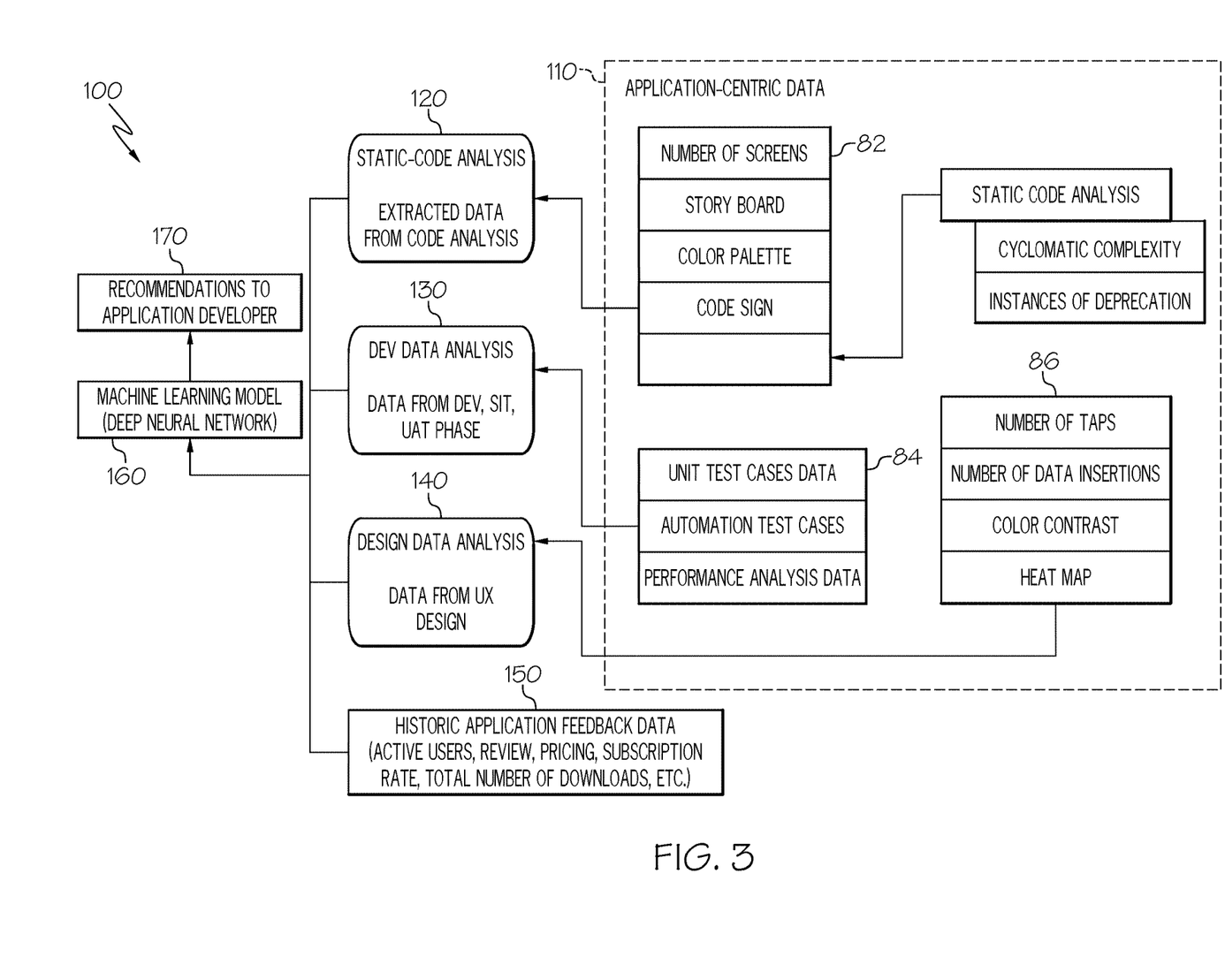
FIG. 3 shows an architecture diagram describing additional functionality according to illustrative embodiments.

Referring now to FIG. 3 in connection with FIG. 2, an architecture diagram 100 describing additional functionality according to some embodiments of the present invention is shown. Application-centric data gatherer 62, as performed by computer system/server 12, can gather application-centric data 110 during a cultivation phase of developing application 80. As used herein, it should be understood that the cultivation phase refers to any activity furthering growth of developing application 80. In some embodiments, the cultivation phase can refer to a development phase of developing application 80, a testing phase of developing application 80, or both. In some embodiments, the cultivation phase can include any activity from application conception up until launch or any other release of the application to a general public through digital distribution platform 70. During cultivation of an application, there are several phases where information central to the application is generated. However, this information is generally used only in isolation to perform a specific task (e.g., evaluating an application performance). Application-centric data gatherer 62 can gather this information in a centralized manner, allowing such generated information to be reutilized to holistically evaluate and optimize developing application 80. This gathering of application-centric data can be in response to submission of developing application 80 to digital distribution platform 70.

For example, in a typical cultivation phase, a static code analysis can be used to determine a security level of a developing application, among other things. Embodiments of the present invention can use this determination as one of many factors when evaluating an application for optimization. In another example, information generated during testing at the system integration testing (SIT) and/or user acceptance testing (UAT) phases can provide information about application test coverage, which can be used as another factor when evaluating an application for optimization. In still another example, unit test and user interface (UI) automation test data can provide information about whether an application has been rigorously tested or not.

In some embodiments, application-centric data gatherer 62 can gather static code data 82, relating to the static code of developing application 80. Static code data 82 can include, but is not limited to, data generated during a static code analysis, such as a determination of a cyclomatic complexity of developing application 80 and/or instances of deprecation in developing application 80. Static code data 82 can also include elements derived from the static code of developing application 80, such as, but not limited to, a number of screens of developing application 80, a story board of developing application 80, a color palette of developing application 80, and a code sign of developing application 80.

In some embodiments, application-centric data gatherer 62 can gather testing data 84, relating to tests conducted on or with developing application 80 during the cultivation phase (which can include a SIT and/or UAT phase). Testing data 84 can include, but is not limited to, results from a unit test case, an automation test case, a performance analysis test, a system integration test (SIT), and a user acceptance test (UAT). In some embodiments, testing data 84 can include some or all raw data generated during any of these tests, or the like. In some other embodiments, testing data 84 may be limited to a summary, conclusion, or other truncated result of such testing, or the like.

In some embodiments, application-centric data gatherer 62 can gather UX data 86. This UX data 86 can include data derived from user interactions with developing application 80, either real or simulated. For example, a bot may be instructed to pretend to be a user and interact with developing application 80 with the purpose of achieving a particular goal (e.g., making a purchase, playing a game), to determine the input that a user would need to provide to developing application 80 in order to achieve that goal. Alternatively or additionally, a person may interact with developing application 80 to generate similar user interaction data. Such UX data 86 can include, but is not limited to, UX elements such as a number of taps, a number of data insertion points, a color contrast, and a usage heat map.

Still referring to FIG. 3 in connection with FIG. 2, data analyzer 64, as performed by computer system/server 12, can analyze, substantially concurrently with the cultivation phase of developing application 80, application-centric data 110 according to a static code analysis 120, testing analysis 130, or UX design analysis 140 of developing application 80. Although the present discussion will focus on static code analysis 120, testing analysis 130, and UX design analysis 140, it should be understood that according to some embodiments of the present invention, data analyzer 64 can conduct additional or alternative analyses of application-centric data 110, including static code data 82, testing data 84, and UX data 86, as well as any other application-centric data 110 generated during the cultivation phase of developing application 80.

Data analyzer 64 can use static code analysis 120 to extract factors useful in evaluating an application for optimization from static code data 82 of application-centric data 110 generated during cultivation of developing application 80. For the purpose of illustration, in one embodiment, data analyzer 64 can perform a code analysis to extract information about number of pages/screens in developing application 80. This can be accomplished, for example, by accessing a storyboard that, in a typical iOS application, may contain information about pages, a number of UI buttons, tappable objects, data insertion functionalities, etc. In another illustrative example, data analyzer 64 can access a color code checking mechanism, present in some digital distribution platforms 70, that checks if a developer used any color code that is not part of an approved color code guideline of digital distribution platform 70 (e.g., App Store's Human Interface Guidelines (HIG)). As will be discussed further below with respect to change recommender 68, such analysis 120 of static code data 82 allows system 60 to not only alert a developer that a color code is not permitted, but to also cross-reference a choice of color palette with historic application feedback data 150 and provide a change recommendation of optimal colors to use instead.

Additionally or alternatively, data analyzer 64 can use testing analysis 130 to extract factors useful in evaluating an application for optimization from application testing data 84 of application-centric data 110 generated during cultivation of developing application 80. Such testing data 84 can be collected by data analyzer 64 from various platforms and throughout various stages of the cultivation phase of developing application 80. Testing data 84 can include API performance information, such as memory leakage, backend API response time, load testing data, multi-threading memory allocation data, etc., which can provide valuable insights to the application optimization process of system 60.

For example, information reports obtained through testing, such as unit test cases, UI test cases, etc., as well as static code analysis, can provide periodic information about whether and to what extent developing application 80 has been tested (e.g., rigorously, insufficiently) in various phases of development. In some embodiments, data analyzer 64 can cluster collected testing data 84 with respect to various categories, such as industry, domain, application etc., for further examination by machine learning model 160, discussed further below. Furthermore, such periodic performance information (e.g., a log of memory consumption) can be indicative of application health over a period of time. As will be discussed further below with respect to change recommender 68, system 60 can use such monitoring data to determine whether developing application is performing in an acceptable range or not. In the case of the later, system 60 can provide real-time recommendations, linking particular application changes to unacceptable performance data periods, that pinpoint which features of developing application 80 should be adjusted to correct the unacceptable performance.

Furthermore, additionally or alternatively, data analyzer 64 can use UX design analysis 140 to extract factors useful in evaluating an application for optimization from UX data 86 of application-centric data 110 generated during cultivation of developing application 80. During UX design analysis 140, data analyzer 64 can determine elements of an anticipated user experience, were a user to use developing application 80. This can include any sensory output, such as colors, user interface, layout, and sounds provided to the hypothetical user by developing application 80, as well as any inputs or types of inputs that the hypothetical user would be expected to provide to developing application 80.

For example, a heat-map analysis provides an insightful factor with respect to user experience, offering a representation of probable or actual user interaction with developing application 80 and, more specifically, with specific sections thereof. For each tap (simulated or real) on a screen displaying developing application 80, a location and a count can be tracked and provided to data analyzer 64. Data analyzer 64 can plot this information as a heat map. Furthermore, data analyzer 64 can use a heat-map analysis to determine which parts of a screen users will touch and with what frequency. As such, a heat-map analysis can be indicative of the user friendliness or lack thereof of developing application 80.

Figure 4:
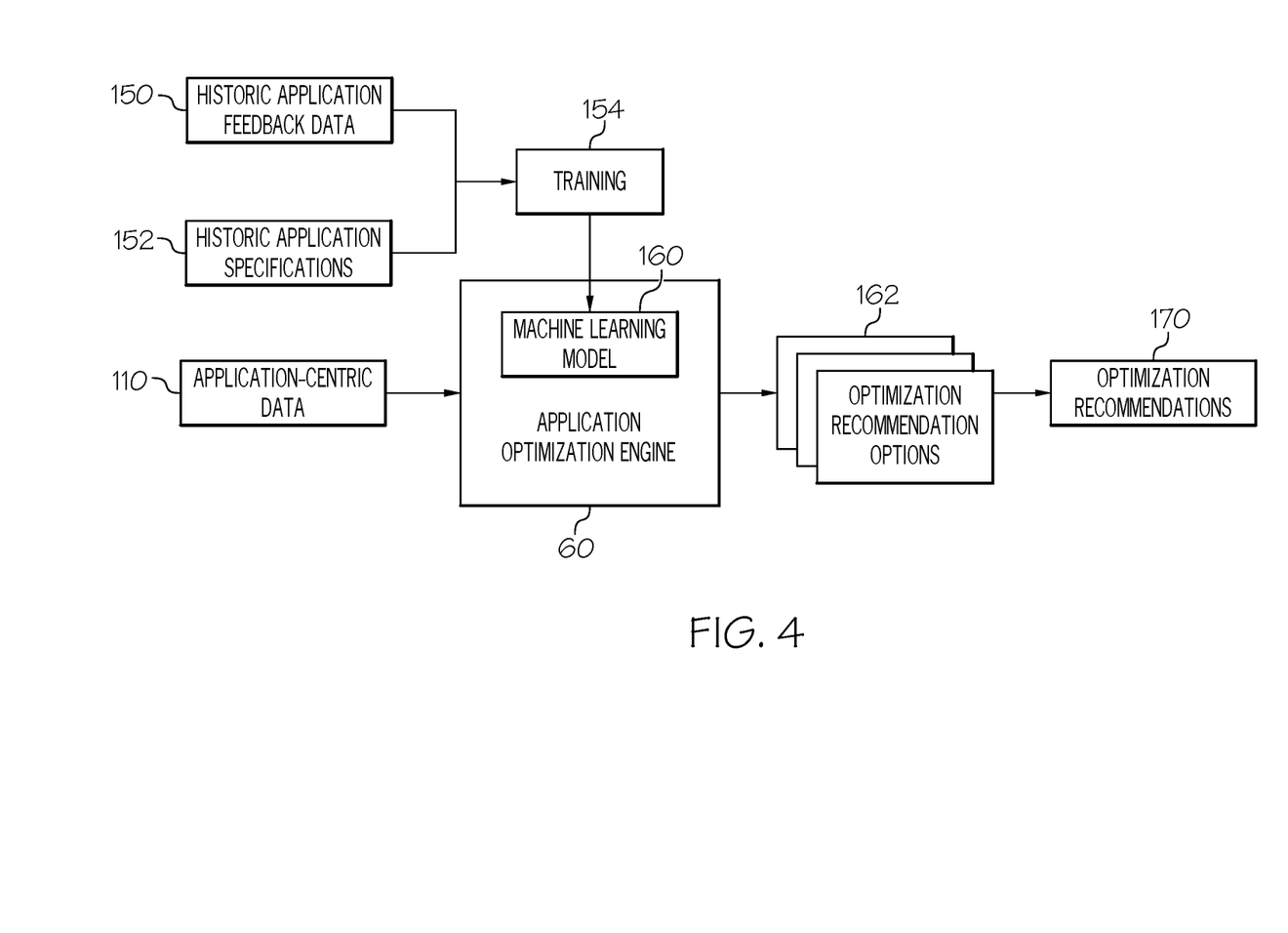
FIG. 4 shows a block diagram for training and using a machine learning model for optimizing a developing application to a user base according to illustrative embodiments.

Referring now to FIG. 4, a block diagram for training and using a machine learning model for optimizing a developing application to a user base is shown. Still referring to FIG. 2 and FIG. 3 in addition to FIG. 4, machine learning applicator 66, as performed by computer system/server 12, can apply machine learning model 160 to analyzed application-centric data 110. This machine learning model 160 can be trained on historic application feedback data 150 from applications available to a user base. Machine learning techniques can be used to train system 60 to recognize features of developing application 80 in application-centric data 110 associated therewith by using historic application feedback data 150 from a user base of digital distribution platform 70 as training data. Historic application feedback data 150 can include any indicators (structured or not) of a user response to an existing application, including, but not limited to: a number of active users and the users' activity, application reviews, application ratings, application pricing, a subscription rate to the application or a service offered through the application, and a total number of downloads of the application. In some embodiments, historic application feedback data 150 can be limited to that associated with applications in a same field, category, area, etc. (e.g., games, ride hailing, messaging, etc.) as developing application 80. In some other embodiments, historic application feedback data 150 can be sourced from across digital distribution platform 70, regardless of any classification of developing application 80.

FIG. 4 shows a high level overview of training machine learning model 160. Training module 154 receives historic application feedback data 150 and specifications 152 of the historical applications corresponding to feedback data 150. According to some embodiments, training module 154 can be a component of machine learning applicator 66 or a component of a separate computer system in the case that machine learning model 160 is pre-trained before being integrated into system 60. As described above, historic application feedback data 150 can include any indicators of a user response to an existing application. Specifications 152 of the historical applications corresponding to feedback data 150 can include structured information about features of the historic applications along the same lines as application-centric data 110 collected by application-centric data gather 62. For example, specifications 152 can include, but are not limited to, static code of the applications, including a number of screens, a story board, a color palette, a code sign, a cyclomatic complexity, and a number of instances of deprecation of the historic application; performance of the historic application and testing results of the historic application during its development; and UX design, including a number of taps, a number of data insertion points, a color contrast, and a usage heat map. Both historic application feedback data 150 and specifications 152 of the historical applications can be obtained as records 76 from historic data storage 74.

Training module 154 uses historic application feedback data 150 and specifications 152 of the historical applications as training data to train machine learning model 160. Machine learning model 160 may use supervised or unsupervised techniques, including regression or clustering. In some embodiments, in a supervised model, feedback data 150 and specifications 152 may be cross-linked and include actual application optimizations, which are labeled as "true," and actual application shortcomings, which are labeled as "false." Training module 154 may then use a classification model to train machine learning model 160. In some other embodiments, in an unsupervised model, training module 154 can use clustering to divide specifications 152 into optimized and not optimized clusters according to feedback data 150 and can train machine learning model 160 to associate webs of specification features as optimized or not. In some embodiments, machine learning model 160 can be a deep learning neural network that training module 154 can train on feedback data 150 and specifications 152 over a period of time to permit deep learning neural network to set its weights based on the supervised or unsupervised learning techniques discussed above.

In any case, machine learning applicator 66 uses a machine learning model that has been trained to predict a likely reception (e.g., with respect to various industries, categories etc.) of recognized features of developing application 80 by a user base and can provide recommendations 170 to optimize these features, as well as developing application 80 overall, to the user base. To accomplish this, machine learning applicator 66 feeds application-centric data 110 into machine learning model 160. Machine learning model 160 examines features/elements of developing application 80 through application-centric data 110 and can determine which features are optimal or suboptimal in light of the other inputted features of application 80, based on historic application feedback data 150 on which machine learning model 160 was trained.

In some embodiments, machine learning model 160 can assign a confidence value to some or all features of developing application 80, indicating a level of optimization of that feature. In some embodiments, this confidence value can be associated with a color zone (e.g., red, yellow green) or other indicator to communicate a degree of optimization or sub-optimization of a particular feature when change recommendations 170 are outputted to a developer, as discussed below. Features with a confidence value below a threshold (which may be a sliding threshold depending on a nature of the feature) are identified for optimization. Based on historic application feedback data 150, machine learning model 160 can determine optimization recommendation options 162 for such identified suboptimal features. Machine learning model 160 can assign a confidence value to optimization recommendation options 162 and output one or more optimization recommendations 170 having the highest confidence value(s).

In some embodiments, machine learning applicator 66 can record optimization recommendation options 162 in historic data storage 74 or some other storage associated with machine learning model 160 for further model refinement and training.

Still referring collectively to FIG. 2, FIG. 3, and FIG. 4, change recommender 68, as performed by computer system/server 12, can generate, based on machine learning model 160, a recommended change 170 to optimize developing application 80 to the user base. In some embodiments, change recommender 68 can attach recommended change 170 as metadata to developing application 80 and return the metadata-annotated application to developer 90 for further refinement. In some other embodiments, change recommender 68 can deliver recommended change 170 separately from developing application 80, for example as a list in a natural language or computer language of suggested changes. In some of these embodiments, SDK 72 can refuse to accept developing application 80 into digital distribution platform 70 until at least one recommended change 170 has been made to developing application 80.

Such recommended changes 170 may permit developing application 80 to be improved to be more user oriented prior to release/deployment, thereby increasing a likelihood of a favorable user response to and strong user pull towards application 80 after release/deployment. Furthermore, based on identified shortcomings of developing application 80 and recommended changes 170 to address the same, resources, such as financial capital and human labor, including development, marketing, and management, can be assigned or otherwise distributed to most efficiently revise developing application 80 to address these shortcomings. As such, recommended changes 170 can be used to create a roadmap for developing a version of application 80 that will be well received in a particular digital distribution platform 70. Several examples of recommended changes 170 are as follows.

In a first example of a recommended change 170, referring back to the earlier example of data analyzer 64 accessing information from a color code checking mechanism, change recommender 68 can provide a suggested color or color palette for use in developing application 80 in response to a determination that a non-approved color is being used in developing application 80. Also, machine learning model 160 may determine that a color or color palette used in developing application 80 historically elicits negative responses from the user base of digital distribution platform 70. In any case, change recommender 68 can offer an alternative color or color palette based on an output of machine learning model 160. For example, in the case that machine learning model 160 finds that historically the most successful social media applications have a color combination pattern of "N" number of colors that are generally shades of "X," but developing application 80 has a color combination pattern of "N+10" number of colors that are shades of "Y," change recommender 68 can suggest that developer 90 and/or the application owner reduce the number of colors used and favor shades closer to "X" than "Y." Such color recommendations 170 need not be limited to merely colors, but can also include contrast, hue saturation, etc.

In another example, machine learning model 160 may determine that a certain user experience offered by developing application 80 is not acceptable for a particular industry or domain of developing application 80 and output optimization recommendations 170 to remedy this. For example, machine learning model 160 may determine that an application for a ride hailing service should have features that make it easy to use and, among other things, applications in such an industry should not have more than a certain number of taps or screens (by contrast a banking application may be expected to be more layered and have more taps/screens). If developing application 80 requires a number of taps/screens that exceed this number, change recommender 68 will inform developer 90 to modify the design, and may offer several suggestions based on successful historical data on how to do so.

In still another example, referring back to the earlier example of a heat-map analysis that indicates which parts of a screen users will touch and with what frequency, change recommender 68 can provide suggestions to modify a UX design to increase a user friendliness of developing application 80. For example, if machine learning model 160 determines that a number of interaction on a screen of developing application 80 is too high or too close together or otherwise confusing (e.g., exit button is directly above submit button, both small in size, and same color), then machine learning model 160 can output optimization recommendation 170 to change recommender 68 to adjust or otherwise better distribute the number of UI-elements on the screen.

In still yet another example, machine learning model 160 can output, and change recommender 68 can provide optimization recommendation 170 that includes an optimized pricing suggestion. This pricing suggestion can be based on pricings of similar, successful applications in digital distribution platform 70, as well as application-centric data 110 to result in a price that is optimum and reasonable both for users and/or consumers and for developers and/or the enterprise offering developing application 80.

Figure 5:
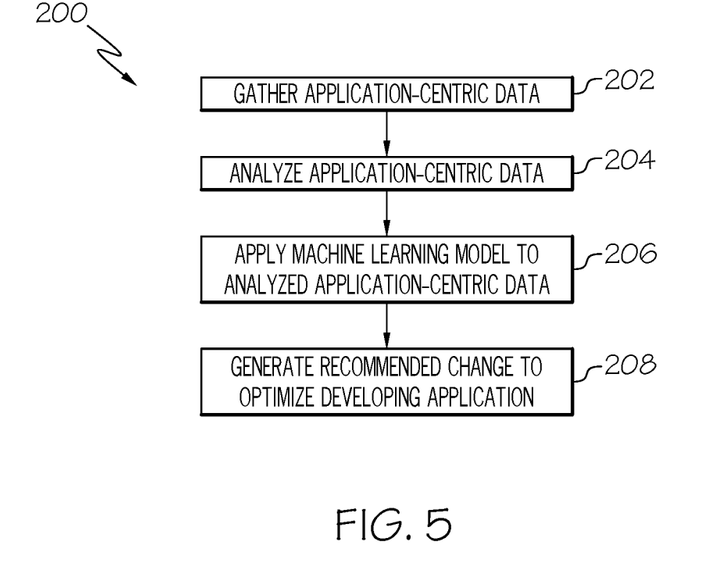
FIG. 5 shows a process flowchart for optimizing a developing application to a user base according to illustrative embodiments.

As depicted in FIG. 5, in one embodiment, a system (e.g., computer system/server 12) carries out the methodologies disclosed herein. Shown is a process flowchart 200 for optimizing a developing application to a user base. At 202, application-centric data gatherer 62 gathers application-centric data 110 during a cultivation phase of developing application 80. At 204, data analyzer 64 analyzes, substantially concurrently with the cultivation phase of developing application 80, application-centric data 110 according to static code analysis 120 of the developing application, testing analysis 130 of the developing application, or user experience (UX) design analysis 140 of the developing application. At 206, machine learning applicator 66 applies machine learning model 160 to analyzed application-centric data 110, machine learning model 160 being trained on historic application feedback data 150 from applications available to the user base. At 208, change recommender 68 generates, based on machine learning model 160, recommended change 170 to optimize developing application 80 to the user base.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a developing application to a user base. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing a developing application to a user base. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to optimize a developing application to a user base. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a developing application to a user base, the method comprising:
gathering application-centric data during a cultivation phase of the developing application;
analyzing, during the cultivation phase of the developing application, the application-centric data according to static code of the developing application, a testing of the developing application, or a user experience (UX) design of the developing application;

applying a machine learning model to the analyzed application-centric data, the machine learning model being trained on historic application feedback data from historic applications in a same category as the developing application to associate user responses with features of the developing application from the application-centric data, the historic application feedback data being obtained from the user base responsive to features of applications available to the user base, wherein the historic application feedback data is structured to correlate features of applications available to the user base with a number of active users, user activity, and application downloads of the applications available to the user base; and generating, based on the machine learning model, a recommended change to optimize the developing application to the user base.

2. The method of claim 1, the application-centric data comprising a security level of the developing application, and at least one element of static code of the developing application, the element being selected from the group consisting of: a number of screens, a story board, a color palette, a code sign, a cyclomatic complexity, and a number of instances of deprecation.

3. The method of claim 1, the application-centric data comprising at least one set of test data of the developing application, the test data being selected from the group consisting of: a unit test case, an automation test case, a performance analysis test, a system integration test (SIT), and a user acceptance test (UAT).

4. The method of claim 1, the application-centric data comprising at least one UX element, the UX element being selected from the group consisting of: a number of taps, a number of data insertion points, a color contrast, and a usage heat map.

5. The method of claim 1, the historic application feedback data on which the machine learning model is trained comprising historical data selected from at least one member of the group consisting of: active users, reviews, ratings, pricing, a subscription rate, and a total number of downloads of an application available to the user base.

6. The method of claim 1, the method further comprising setting a set of weights in the machine learning model by training the machine learning model over a period of time on the application data from applications available to the user base.

7. The method of claim 1, the method further comprising attaching the recommended change to optimize the developing application to the user base to the developing application as metadata.

8. A computer system for optimizing a developing application to a user base, the computer system comprising:
a memory medium comprising program instructions;
a bus coupled to the memory medium; and
a processor, for executing the program instructions, coupled to an application optimization engine via the bus that when executing the program instructions causes the system to:
gather application-centric data during a cultivation phase of the developing application;
analyze, during the cultivation phase of the developing application, the application-centric data according to static code of the developing application, a testing of the developing application, or a user experience (UX) design of the developing application;
apply a machine learning model to the analyzed application-centric data, the machine learning model being trained on historic application feedback data from historic applications in a same category as the developing application to associate user responses with features of the developing application from the application-centric data, the historic application feedback data being obtained from the user base responsive to features of applications available to the user base, wherein the historic application feedback data is structured to correlate features of applications available to the user base with a number of active users, user activity, and application downloads of the applications available to the user base; and
generate, based on the machine learning model, a recommended change to optimize the developing application to the user base.

9. The computer system of claim 8, the application-centric data comprising a security level of the developing application, and at least one element of static code of the developing application, the element being selected from the group consisting of: a number of screens, a story board, a color palette, a code sign, a cyclomatic complexity, and a number of instances of deprecation.

10. The computer system of claim 8, the application-centric data comprising at least one set of test data of the developing application, the test data being selected from the group consisting of: a unit test case, an automation test case, a performance analysis test, a system integration test (SIT), and a user acceptance test (UAT).

11. The computer system of claim 8, the application-centric data comprising at least one UX element, the UX element being selected from the group consisting of: a number of taps, a number of data insertion points, a color contrast, and a usage heat map.

12. The computer system of claim 8, the historic application feedback data on which the machine learning model is trained comprising historical data selected from at least one member of the group consisting of: active users, reviews, ratings, pricing, a subscription rate, and a total number of downloads of an application available to the user base.

13. The computer system of claim 8, the instructions further causing the system to set a set of weights in the machine learning model by training the machine learning model over a period of time on the application data from applications available to the user base.

14. The computer system of claim 8, the instructions further causing the system to attach the recommended change to optimize the developing application to the user base to the developing application as metadata.

15. A computer program product for optimizing a developing application to a user base, the computer program product comprising a computer readable hardware storage device, and program instructions stored on the computer readable hardware storage device, to:
gather application-centric data during a cultivation phase of the developing application;
analyze, during the cultivation phase of the developing application, the application-centric data according to static code of the developing application, a testing of the developing application, or a user experience (UX) design of the developing application;
apply a machine learning model to the analyzed application-centric data, the machine learning model being trained on historic application feedback data from historic applications in a same category as the developing application to associate user responses with features of the developing application from the application-centric data, the historic application feedback data being obtained from the user base responsive to features of applications available to the user base, wherein the historic application feedback data is structured to correlate features of applications available to the user base with a number of active users, user activity, and application downloads of the applications available to the user base; and generate, based on the machine learning model, a recommended change to optimize the developing application to the user base.

16. The computer program product of claim 15, the application-centric data comprising a security level of the developing application, and at least one element of static code of the developing application, the element being selected from the group consisting of: a number of screens, a story board, a color palette, a code sign, a cyclomatic complexity, and a number of instances of deprecation.

17. The computer program product of claim 15, the application-centric data comprising at least one set of test data of the developing application, the test data being selected from the group consisting of: a unit test case, an automation test case, a performance analysis test, a system integration test (SIT), and a user acceptance test (UAT).

18. The computer program product of claim 15, the application-centric data comprising at least one UX element, the UX element being selected from the group consisting of: a number of taps, a number of data insertion points, a color contrast, and a usage heat map.

19. The computer program product of claim 15, the historic application feedback data on which the machine learning model is trained comprising historical data selected from at least one member of the group consisting of: active users, reviews, ratings, pricing, a subscription rate, and a total number of downloads of an application available to the user base, wherein the computer readable storage device further comprises instructions to set a set of weights in the machine learning model by training the machine learning model over a period of time on the application data from applications available to the user base.

20. The computer program product of claim 15, the computer readable storage device further comprising instructions to attach the recommended change to optimize the developing application to the user base to the developing application as metadata.

* * * * *